United States Patent [19]

Haupin

[11] 4,050,302

[45] Sept. 27, 1977

[54] THERMOELECTRIC HEAT FLOW TRANSDUCER

[75] Inventor: Warren E. Haupin, Lower Burrell, Pa.

[73] Assignee: Aluminum Company of America, Pittsburgh, Pa.

[21] Appl. No.: 660,264

[22] Filed: Feb. 23, 1976

Related U.S. Application Data

[63] Continuation of Ser. No. 548,401, Feb. 10, 1975, abandoned.

[51] Int. Cl.² ............................................. G01K 17/00
[52] U.S. Cl. .................................. 73/190 H; 136/225
[58] Field of Search ........... 73/15 R, 190 H, 190 EW; 136/224, 225

[56] References Cited

U.S. PATENT DOCUMENTS

| 1,528,383 | 3/1925 | Schmidt | 73/190 |
|---|---|---|---|
| 3,059,471 | 10/1962 | Calvet | 73/190 |
| 3,194,071 | 7/1965 | Hager, Jr. | 73/190 |
| 3,314,288 | 4/1967 | Sherwin | 73/190 |
| 3,808,889 | 5/1974 | Rawson et al. | 73/190 |

FOREIGN PATENT DOCUMENTS 1,037,729  8/1966  United Kingdom .................. 73/190

*Primary Examiner*—Herbert Goldstein
*Attorney, Agent, or Firm*—Elroy Strickland

[57] ABSTRACT

A calorimetric transducer comprising spaced parallel metallic plates sandwiching an open region of high thermal resistivity. A plurality of wires of high thermal conductivity bridge the open space to reduce the thermal resistivity thereof to a predetermined level and further function to structurally support the plates as well as to form a plurality of differential thermocouples therewith. Means are provided to serially connect the differential thermocouple to provide an amplified response and a flux meter is provided to pesent a visual indication of the flux rate measured by the calorimetric transducer.

5 Claims, 6 Drawing Figures

THERMOELECTRIC HEAT FLOW TRANSDUCER

CROSS-REFERENCE TO RELATED APPLICATION

This is a continuation of application Ser. No. 548,401, filed Feb. 10, 1975 now abandoned.

BACKGROUND OF THE INVENTION

The subject invention relates generally to calorimeters and, more particularly, to thermoelectric calorimeters of the type in which heat flux is determined by an electrical signal induced by a temperature difference.

The transfer of thermal or heat energy is involved in many engineering design problems. A typical situation may extend from the design of a simple fluid heater to a complex heat transfer system for a re-entry vehicle.

In practice, heat transfer problems often prove too complicated to admit of a direct estimation of heat flow rates from temperature measurements and known thermal properties. Accordingly, there is a need for devices capable of direct measurement of heat fluxes. Although the rate of energy exchange of heat flux is a very fundamental parameter in any thermal analysis, it is not one that is readily measured, as in the case of temperature, for example.

Devices employed to measure thermal energy exchange are generally referred to as calorimeters. Through the years, many techniques have been employed to fabricate calorimeters for the purpose of measuring the rate of energy exchange between a given body and a source of heat. Generally, however, these techniques employ one of two fundamental concepts; thermal capacity, or thermal gradient.

In employing the concept of thermal capacity, the temperature rise of a known mass of a substance, such as water or a copper slug, is related to the rate of heat transfer to the substance. Devices employing this concept are, however, not readily applied to rapid transient measurements.

In employing the concept of thermal gradient, the rate of energy transfer to a substance, such as a solid, is related to a measurable temperature gradient on/or in the substance.

Several approaches have been taken in the development of calorimeters employing the concept of thermal gradient. In one category of devices the temperature difference over a finite thickness of material, so oriented that the heat will pass through the desired path to insure that the temperature difference measured will be proportional to the incident flux, is determined. In another series of devices temperatures histories at specific points within a solid are measured and the surface temperature gradient, and hence heat flux, may be analytically determined therefrom. However, the determination of heat flux based on temperature histories at specific points within a body has proven to be an exceedingly time consuming and expensive procedure and has only been resorted to in applications of an extremely unusual nature.

In certain process control applications, such as in the measure of heat flux losses from aluminum reduction cells, there exists a need for a rugged calorimeter that is able to withstand exceedingly high temperatures, rough handling, high humidity, and which is unaffected by aging and provides a reproducible thermal resistance and a reproducible heat flux calibration. In this regard, previous calorimeters or heat flow transducers of the thermal gradient variety have used plastic, ceramic, semi-conductor or metal thermal barriers in conjunction with various means for determining the temperature differential across these barriers to thereby determine heat flux therethrough. Unfortunately, plastics and semi-conductors do not stand up well under high temperatures; ceramics have proven brittle and readily damaged under any but the most careful handling; and metals provide too little temperature differential at relatively low heat flux.

A common problem in the design of any practical calorimeter is that the magnitude of response must be sufficient for measurement by available instrumentation. In considering the problem of designing a calorimeter of the thermal gradient type from the standpoint of response magnitude, one must envision a uniform heat flux $\Delta F$ passing through a homogeneous infinite sheet of material having a thickness $\delta$ and a thermal conductivity $k$. Consider the flow of heat as perpendicular to the sheet and accompanied by temperature difference $\Delta T$ between its two faces. Under steady-state conditions, it is known that $\Delta F = k\Delta T/\delta$. However, where $\Delta T$ is small and is measured with a differential thermocouple system, it can be shown that $\Delta T = \Delta e/c'$, where $\Delta e$ is the thermocouple EMF and $c'$ is a temperature dependent coefficient computed from published tables for the particular thermocouple materials employed.

From the foregoing equations it follows that $\Delta F = (k/c'\delta)\Delta e$.

Clearly, if the values $k$, $c'$, and $\delta$ are known, $\Delta F$ may be readily calculated from $\Delta e$ and the device can be used to measure heat fluxes and is therefore known as a calorimeter or heat meter.

SUMMARY OF THE INVENTION

The present invention contemplates a novel calorimeter of the thermal gradient variety employing a transducer to convert the thermal gradient into an EMF which may then be read out by a calibrated meter directly in terms of heat flux.

Briefly, one embodiment of the instant invention envisions a pair of spaced parallel metal plates separated by a small air gap. The air gap itself is bridged by a plurality of uniformly spaced view, which typically comprise a metal dissimilar to that employed for the plates. The entire structure essentially comprises an air filled sandwich with the air gap producing a high thermal resistance. The wires bridging the air gap reduce this resistance to a predetermined desired value, and the number and cross section of the wires are adjusted to provide a thermal gradient, or temperature drop, which is large enough to be measurable at the expected heat flux, but small enough so as not to significantly alter the normal heat flux. The same wires function as both structural members and to control thermal resistance while at the same constituting a differential thermocouple to provide an electrical signal which is proportional to the heat flux being measured. The edges of the air gap around the periphery of the sandwich are sealed with an electrically nonconductive cement having low thermal conductance which functions to prevent air flow between the plates and prevent the entrance of dirt which might alter the instrument's calibration. A pair of leads, of material similar to that used for the plates, are connected one to each plate and function to provide the output EMF to the read-out mechanism being employed. In addition, a thermocouple pair of wires are connected to one of the plates so as to provide an indication of the plate temperature for calibration purposes, as it is known, in accordance with the previously described equation, that heat flux is a function of temperature for any given output EMF.

In the embodiment just described, the output EMF is a function of the average thermal gradient between the two plates of the sandwich and the individual differential thermocouples provided by the wires extending between the plates are essentially connected in parallel.

In another embodiment of the instant invention, it has been found that the output EMF may be multiplied by serially connecting the differential thermocouples formed by the wires extending between the plates to provide a sort of thermopile effect. To effect such a multiplication in output EMF, it is necessary that the cold junction of one differential thermocouple be connected to the hot junction of the preceding differential thermocouple. Such a serial connection may be effected by having every other wire constructed of such a material as to establish a differential thermocouple with the upper and lower plates while alternating with wires of the same material as the two plates, which wires merely serve to establish conductive paths between the differential thermocouples. At the same time, the two plates are alternately broken between adjacent wires such that a conductive path exists only between opposite ends of successive thermocouple wires.

In this summer, it is possible to utilize a calorimeter employing a total of 20 wires extending between the two plates with 10 of the wires constituting differential thermocouples and such a system will provide an output EMF ten times that experienced in a system employing 20 differential thermocouple wires evenly spaced between the adjacent plates when constructed in accordance with the first described embodiment.

In view of the foregoing, it is an object of the present invention to provide an improved calorimeter of the thermal gradient type.

Another object of the instant invention resides in the provision of a calorimeter of the thermal gradient type employing a plurality of differential thermocouples arranged in electrical parallelism.

It is another object of the present invention to provide an improved calorimeter for use in high temperature applications and adapted to withstand rugged handling while remaining relatively unaffected by aging or humidity.

Yet a further object of this invention is to provide an improved calorimeter of the thermal gradient type for use in process control applications in connection with aluminum reduction cells, wherein the calorimeters are adapted to be magnetically attached to said cells.

It is an additional object of this invention to provide an improved calorimetric device operating on the thermal gradient principle wherein the thermal gradient is maintained at a large enough level to be measurable at the expected heat flux yet at a small enough level so as not to significantly alter the normal heat flux.

A still additional object of this invention is to provide a calorimetric device employing a plurality of wires uniformly disposed between and bridging a pair of spaced parallel plates wherein the wires function as structural members, thermal resistance and differential thermocouples.

DESCRIPTION OF THE DRAWINGS

Other objects and many of the attendant advantages of the present invention will be better appreciated and said invention will become clearly understood by reference to the following detailed description when considered in conjunction with the accompanying drawings illustrating two embodiments of the instant invention, wherein.

DETAILED DESCRIPTION OF THE INVENTION

Figure 1:
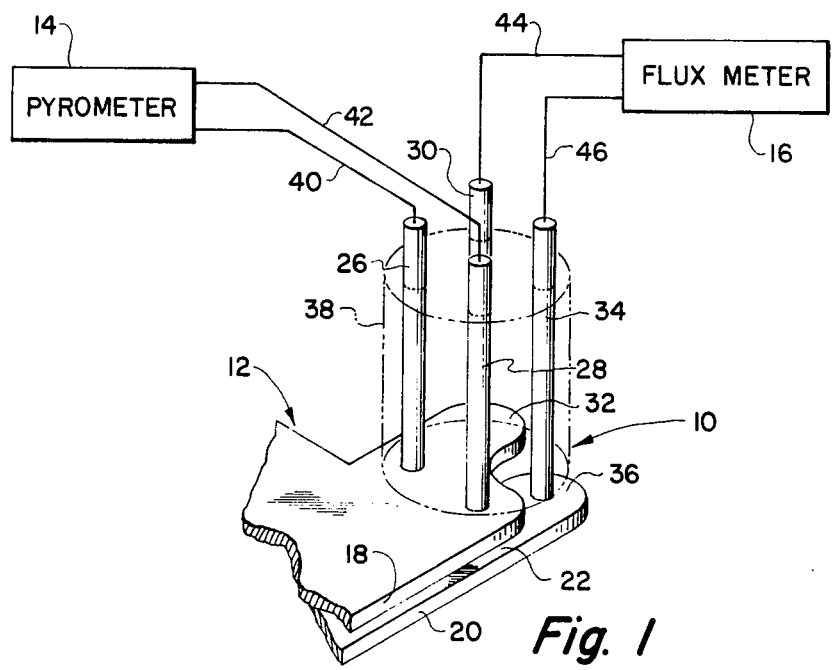
FIG. 1 provides a simplified perspective of a first embodiment of the subject invention partially broken away.

Referring now to the drawings in more detail, and, more particularly to FIG. 1, the invention is illustrated generally at 10 and is seen to include a transducer portion 12, a temperature measuring portion or pyrometer 14 and a flux meter portion 16.

Figure 3:
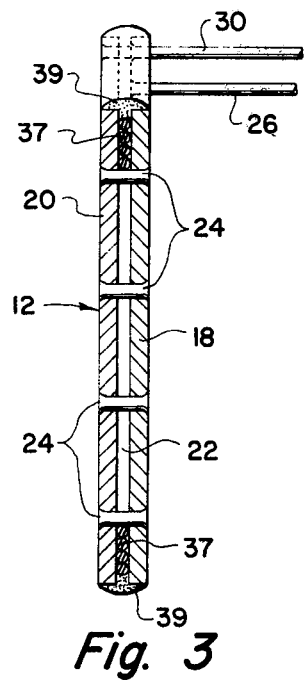
FIG. 3 provides a simplified cross-section of said first embodiment of the subject invention taken along line 3—3 of FIG. 2.

As seen in FIGS. 1 and 3, the transducer portion 12 comprises a pair of spaced parallel plates 18 and 20 with the plate 18 constituting the upper or top plate and the plate 20 constituting the lower or bottom plate as illustrated (FIG. 1). It should be understood, however, that the orientation of the transducer assembly 12 may be varied to suit the requirements of a particular application thereof and that its performance is independent of its orientation.

Typically, the upper and lower plates 18 and 20, respectively, are fabricated of, for example, mild steel having a thickness of 0.064 inches. The plates are generally rectangular and in the embodiment of FIGS. 1 through 3, they are square with a surface area of 1½ inches square. In general, the configuration of the plates 18 and 20 may be altered as desired so long as a known predetermined surface area is maintained.

The plates 18 and 20 are separated by an air gap 22 and in the embodiment illustrated an air gap 22 of 0.032 inches has been found satisfactory.

Figure 2:
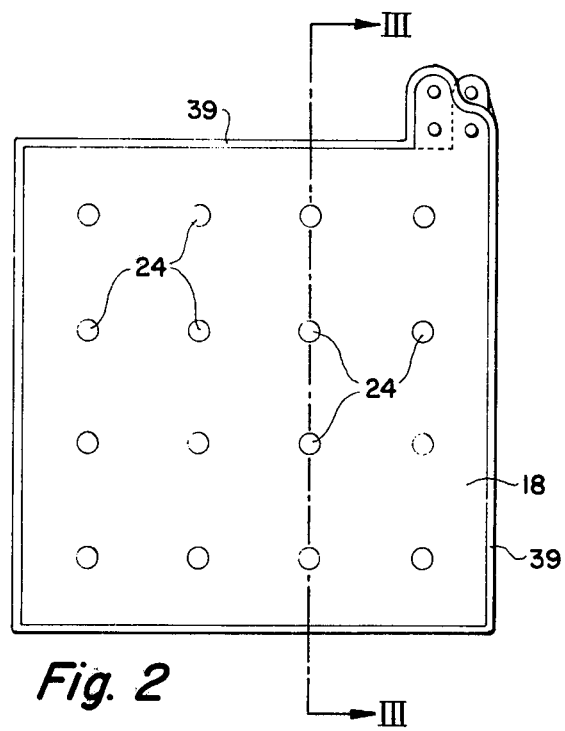
FIG. 2 provides a simplified diagrammatic plan of said first embodiment of the subject invention.

As best seen in FIGS. 2 and 3, a plurality of wires 24 are illustrated extending normally between the upper and lower plates 18 and 20 so as to bridge the gap 22. The plurality of wires 24 are shown arranged in a matrix which, in the example illustrated, is a four by four matrix constituting a total of 16 such wires 24. The wires 24 function as structural members in supporting the plates 18 and 20 in spaced parallel relation, while coacting therewith to establish a plurality of differential thermocouples, as will be explained in more detail, infra. The wires 24 further serve to control the thermal resistance of the transducer 12 because the thermal resistance of the air gap 22, itself, is extremely high. The number and cross-sectional area of the wires 24 are chosen for any application such that a large enough temperature drop will be established between the plates 18 and 20 to provide an output signal of sufficient magnitude without significantly altering the normal heat flux through the device being measured. By evenly spacing the wires 24, the flux distribution across the plates 18 and 20 remains uniform.

In the embodiment illustrated in FIGS. 1 through 3, the wires 24 are fabricated of Constantan and are 14 gauge and with the four by four matrix of FIG. 2, the 16 Constantan wires 24 will be spaced three eighths of an inch center-to-center. As best seen in FIG. 3, the wires 24 extend through the plates 18 and 20 and are welded thereto. It should be emphasized at this point that the wires 24 may be constructed of any desired material and that the plates 18 and 20 may be constructed of any desired material as long as the wires 24 and the plates 18 and 20 are constructed of material such that the junctions of the wires 24 and the plates 18 and 20 will function as thermocouple pairs.

In fabricating the transducer 12, a plurality of 0.064 inch diameter holes are drilled in each of the plates 18 and 20 at locations corresponding to the positions of the wires 24, and the holes are slightly countersunk at the outer surfaces on the plates 18 and 20. The plates 18 and 20 are held in parallel spaced relation (with a gap 22 of 0.032 inch) by means of eight 20 gauge Chromel wires sandwiched between the plates, and the wires 24 are inserted through the openings in the plates 18 and 20 and then expanded in the holes by means of a center punch. Thereafter, the wires 24 are filed off at the outer surfaces of the plates 18 and 20 allowing approximately 1/64 of an inch to protrude from such surfaces. Each of the wires 24 is then individually heliarc welded at the outside surfaces, using argon as the shielding gas and a 3/32 inch tungsten tip at 130 amps in order to obtain good weld penetration into the plates 18 and 20. After the wires 24 have been welded in place, the Chromel wires maintaining the initial spacing between the plates 18 and 20 are removed in a well-known manner.

As best seen in FIGS. 1 and 3, three lead wires 26, 28 and 30 are secured to the upper plate 18 at an ear portion 32 extending from one corner of the plate 18. A single lead wire 34 is secured to an ear portion 36 extending from one corner of the lower plate 20 proximate the ear portion 32 of the plate 18. The lead wires 26 and 28 are, in the embodiment illustrated in FIGS. 1 to 3, fabricated of Chromel and Alumel, respectively. The lead wires 26 and 28 are of fourteen gauge and are secured to the plate 18 in a manner similar to that of the Constantan wires 24, that is, 0.064 inch diameter holes are drilled through the plate 18 and the lead wires 26 and 28 are forced through, heliarc welded on the opposite surface, and the protruding welds are filled flat. The lead wires 30 and 34 are similarly of 14 gauge and are similarly attached to the plates 18 and 20, respectively. However, both leads 30 and 34 are fabricated of iron so as not to form thermocouple junctions with their respective plates 18 and 20.

The lead wires 26 and 28 constitute a thermocouple pair with the mild steel plate 18 and, in practice, will provide an output EMF proportional to the temperature of the plate 18. In contradistinction, the lead wires 30 and 34 do not constitute a thermocouple pair with the plates 18 and 20 but do provide an output EMF which reflects the EMF existing between the two plates 18 and 20, as will be explained hereinafter.

As best seen in FIG. 3, the periphery of the transducer assembly 12 is sealed in order to keep foreign material from entering the air gap 22 and thereby changing the calibration of the transducer 12. The sealing is effected by wrapping four turns of 1/16 inch diameter Refrasil cord 37 around the outside row of the Constantan wires 24 and then the remaining gap is filled with Ceramabond No. 503 high temperature ceramic adhesive to provide a rounded edge portion 39. The Ceramabond 503 seal is cured for about 16 hours at 150° C.

Before proceeding, it should be noted that it is possible to eliminate one of the lead wires 26 or 28 and utilize the lead wire 30 in its place to form the thermocouple pair with the remaining one of the lead wires 26 and 28. In such a situation, the iron lead wire 30 will still function together with the lead wire 34 to provide an output EMF corresponding to the temperature differential between the plates 18 and 20.

As best seen in FIG. 1, a ceramic sleeve 38 is placed over the lead wires 26, 28, 30 and 34 and functions as both a convenient handle with which the grasp the transducer assembly 12 and a means of insulating the wires 26, 28, 30 and 34 from one another. Additionally, the pyrometer 14 is connected to the lead wires 26 and 28 in a well-known manner as by the lead wires 40 and 42, respectively. Similarly, the flux meter 16 is connected to the lead wires 30 and 34 in a well-known manner as by the lead wires 44 and 46, respectively.

It should be emphasized that both the pyrometer 14 and the flux meter 16 are conventional potentiometric meter movements designed to provide an output in response to an input EMF. The distinction between the two meters is simply that the pyrometer 14 has a built in reference junction and is calibrated to provide a direct indication of temperature in response to its input EMF while the flux meter 16 is calibrated to provide a direct indication of heat flux in response to its respective input EMF.

In operation, the transducer assembly 12 is placed in contact with the object whose heat flux rate is desired, such as the wall of a furnace. In this regard it should be noted that in certain applications, such as in the case of aluminum reduction pots or cells, there exists a large electromagnetic field around the device whose heat flux is being determined. In such a situation, the use of mild steel for the plates 18 and 20 in conjunction with the Constantan wires 24 provides added utility in that the transducer assembly 12 may be magnetically annexed to the wall of the source.

Considering the operation of the embodiments of the invention illustrated in FIGS. 1 through 3 in more detail, it should be clear that with the bottom plate 20 against the wall of the heat source, heat from the source will be transmitted through the plate 20 and thence primarily through the wires 24 (albeit there will be some heat transfer through the air gap 22 itself) to the plate 18. Clearly the plate 18 will be at a somewhat lower temperature than the plate 20 and thus each of the wires 24 will form a hot and a cold thermocouple junction with the plates 20 and 18, respectively.

In essence, then, each of the wires 24 will function as a differential thermocouple providing an output EMF as a function of the temperature difference between its junctions with the plates 20 and 18. Because of the manner of connection of the wires 24 to the plates 18 and 20, each of the differential thermocouples formed by the wires 24 are electrically in parallel and the cold junctions at the plate 18 will produce an output EMF which will be transmitted through the plate 18 to the lead wire 30 while the hot junctions of the wire 24 with the plate 20 will produce an output EMF which will be transmitted through the plate 20 to the lead wire 34 with the difference between the output EMF from the lead wires 30 and 34 being a function of the average temperature differential between the plates 18 and 20 and hence the average heat flux through the transducer assembly 12.

As mentioned hereinabove, the lead wires 26 and 28 form a thermocouple pair providing an output EMF indicative of the temperature of the plate 18. Such a temperature indicator is necessary for calibration of the calorimeter assembly 10 because the EMF produced between the lead wires 30 and 34, for a given heat flux through the transducer assembly 12, will vary with the temperature of the transducer assembly 12 as stated hereinabove.

Figure 4:
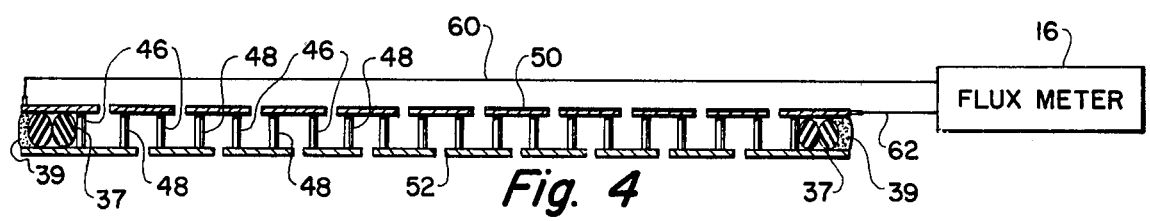
FIG. 4 provides a simplified diagrammatic representation of the manner in which the differential thermocouples of a second embodiment of the subject invention are interconnected.

Referring again to FIGS. 4 through 6, a second embodiment of the subject invention is schematically set forth and, except as otherwise specified, is constructed in the same manner as the embodiment of FIGS. 1 to 3, supra.

Figure 5:
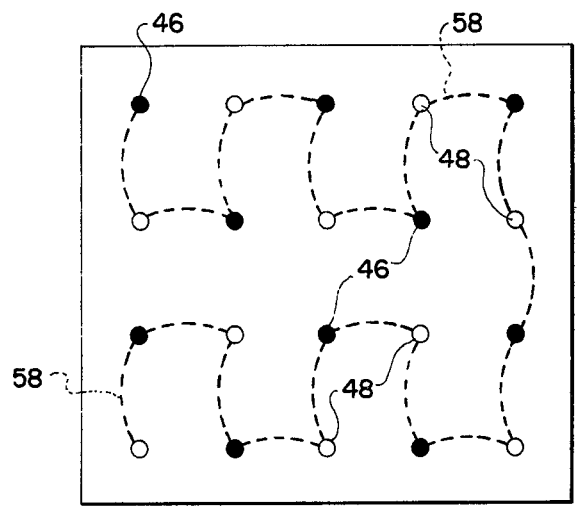
FIG. 5 provides a diagrammatic plan of the layout of the differential thermocouples of said second embodiment of the subject invention.
Figure 6:
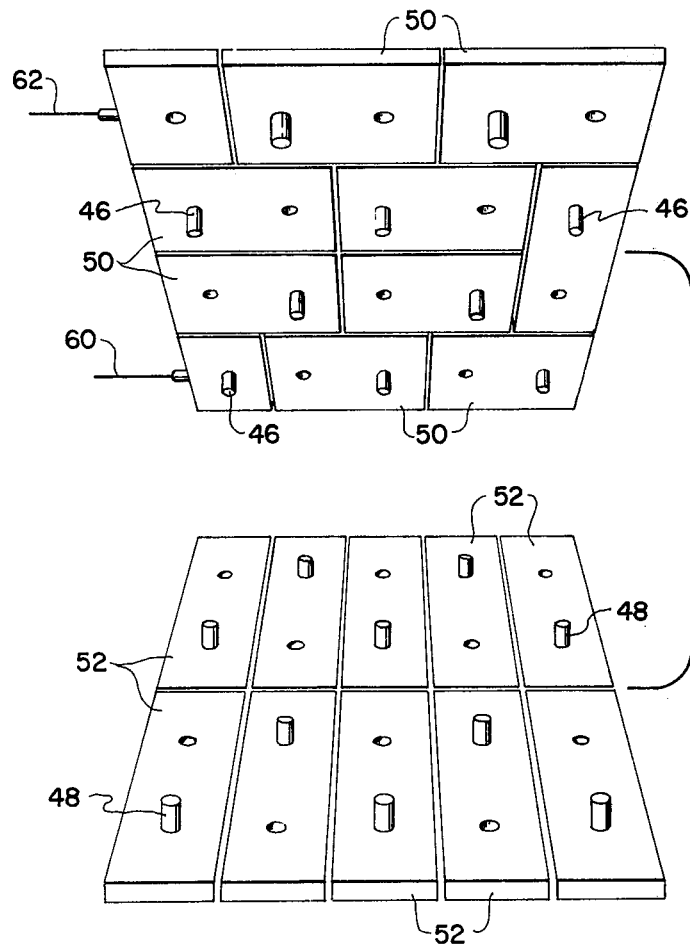
FIG. 6 provides a simplified exploded perspective illustrating the manner in which the upper and lower plates of the second embodiment of the subject invention are cut to establish electrical discontinuities.

As best seen in FIGS. 5 and 6, the Constantan wires 24 of the embodiment of FIGS. 1 through 3 have been replaced with a plurality of alternating Constantan wires 46 and Chromel wires 48. Similarly, the upper and lower plates 18 and 20, respectively, of the embodiment of FIGS. 1 through 3 have been replaced with upper and lower Chromel plates 50 and 52, respectively, which are alternately cut or broken between successive ones of the Constantan wires 46 and the Chromel wires 48. As best seen in FIGS. 5 and 6, there are a total of 10 Constantan wires 46 illustrated and a total of 10 Chromel wires 48.

As best seen in FIG. 6, the upper plate 50 is cut between the intersections of the various wires 46 and 48 therewith in a pattern indicated at 54. Similarly, the lower plate 52 is cut between the intersections of various ones of the wires 46 and 48 therewith in a pattern indicated at 56.

By cutting the upper plate 50 and the lower plate 52 as specified, an electrically conductive path will exist between the wires 46 and 48 as indicated in phantom in FIG. 5 by the pattern 58. More specifically, the electrical path between the wires 46 and 48 is such that the intersection of one of the Constantan wires 46 with the upper plate 50 (which, of course, forms a thermocouple junction) is connected to the intersection of an adjacent Chromel wire 48 with the lower plate 52 (which, of course, does not form a thermocouple junction) which, in turn, is electrically connected to the intersection of one of the next succeeding Constantan wires 46 with the plate 50, and so on. Thus, with the transducer configured in accordance with FIGS. 5 through 6, and with the lower or bottom plate 52 placed adjacent a heat source, the junctions of the Constantan wires 46 with the top plate 50 will be relatively cold junctions and the junctions of the Constantan wires 46 with the bottom plate 52 will be relatively hot junctions.

Inasmuch as each of the Constantan wires forms a thermocouple pair with the Chromel plates 50 and 52 while the Chromel wires 48 do not form such thermocouple pairs, each of the Constantan wires 46 will effectively perform as a differential thermocouple in the manner described for the embodiment of FIGS. 1 through 3, with the exception that the differential thermocouple will no longer be connected in parallel but are effectively connected in electrical series, with the hot junction of one of the wires 46 connected to the cold junction of the next succeeding wire 46.

Referring again to FIG. 4, the interconnection between the wires 46 and 48 and the plates 50 and 52 is schematically illustrated as if the wires 46 and 48 were arranged in a single row between the plates 50 and 52. As is clearly evident in FIG. 4, the 20 wires 46 and 48 will yield 10 differential thermocouples in the form of the wires 48 which are serially arranged hot junction to cold junction such that, assuming the temperature differential between the plates 50 and 52 is uniform, they will yield an output EMF equal to that of one of the differential thermocouples multiplied by the number of differential thermocouples. In the embodiment illustrated, the output EMF will be 10 times that experienced across a single differential thermocouple.

Because the differential thermocouples are serially connected, it is not necessary to connect wire leads to the plates 50 and 52 to obtain a readout, but merely to attach a first output lead 60 to the top plate 48 at a region in continuous circuit relation with the first in the serial chain of wires 46, and a second output lead 62 to a region of said top plate 48 in continuous circuit relation with either the last of the series of leads 46, or the last of the series of leads 48.

As in the case of the embodiment of FIGS. 1 through 3, the output leads 60 and 62 should preferably be of the same material as the plate 48 so as not to, themselves, establish independent thermocouple pairs. In the embodiment described, the leads 60 and 62 are Chromel as are the plates 50 and 52. It should be clear at this point as in the case of the embodiment of FIGS. 1 through 3, it may be desirable to establish the temperature of the transducer for calibration purposes, and in such a case it is simply necessary to connect an Alumel wire to the top plate 50 in continuous circuit relation with one of the wires 60 or 62 to effect a thermocouple pair, or alternately both a Constantan and an Alumel wire may be connected to a common portion of the top plate 50 to provide a completely independent output indication of temperature.

It can readily be seen that many variations and modifications of the present invention are possible in light of the aforementioned teachings and it will be apparent to those skilled in the art that various changes in form and arrangement of components may be made to suit requirements without departing from the spirit and scope of the invention. It is therefore to be understood that within the scope of the appended claims, the instant invention may be practiced in a manner otherwise than is specifically described herein.

What is claimed is:

1. A thin, rugged, heat resistant device for measuring the rate of heat flow passing through a structure having a surface exposed to ambient conditions comprising
a first, relatively thin metal plate adapted to be placed in direct physical contact with the exposed surface of the structure passing heat,
a second, relatively thin metal plate located in spaced, rigid, parallel relation with said first plate and generally coextensive therewith to form a sandwich-like structure having a relatively narrow space between the plates,
a plurality of spaced openings provided in and extending through said first and second places, and
a plurality of relatively short, structural, thermal conductors extending through said openings and plates and bridging the narrow space therebetween to provide a plurality of heat paths between the plates, the conductors being made of a material having a relatively high coefficient of thermal conductivity, and capable of supporting the plates in said rigid, parallel relation, said conductors in combination with at least one of said plates providing a plurality of differential thermocouples, the conductors being in intimate, physical contact with each plate so that, in addition, good heat conduction is provided between each conductor and each plate whereby the impedance to and the disturbance of the rate of heat flow through the structure being measured is such that a temperature drop is established between the metal plates to provide a temperature representing signal without substantially altering normal heat flow through the structure.

2. The apparatus of claim 1, wherein said differential thermocouples are connected in electrical parallelism.

3. The apparatus of claim 1, wherein said differential thermocouples are connected in electrical seriesrelation such that the magnitude of their effective output is a function of their number.

4. The apparatus described in claim 1, further including means for sealing the adjacent peripheral edge portions of said first and second plate means to prevent the entry of foreign matter into said region.

5. The structure of claim 1 in which the first and second plates are divided into closely spaced segments, the segments of the respective plates being disposed in relation to each other such that each segment of one plate overlaps at least two segments of the other plate and, at least two thermal conductors extending through the segments and between overlapping segments.

* * * * *

UNITED STATES PATENT OFFICE
CERTIFICATE OF CORRECTION

Patent No. 4,050,302                    Dated September 27, 1977

Inventor(s) Warren E. Haupin

It is certified that error appears in the above-identified patent and that said Letters Patent are hereby corrected as shown below:

| | |
|---|---|
| Abstract, line 10 | Change "pesent" to --present--. |
| Col. 1, line 23 | After "exchange", change "of" to --or--. |
| Col. 2, line 30 | Change "$\Delta$Fmay" to --$\Delta$F may--. |
| Col. 2, line 44 | Change "view" to --wires--. |
| Col. 2, line 56 | After "same", insert --time--. |
| Col. 3, line 28 | Change "summer" to --manner--. |
| Col. 5, line 23 | Change "on" to --of--. |
| Col. 5, line 52 | Change "filled" to --filed--. |
| Col. 6, line 19 | Change "the" (first occurrence) to --to--. |
| Col. 6, line 20 | Delete "." after "transducer". |

UNITED STATES PATENT OFFICE
CERTIFICATE OF CORRECTION

Patent No. 4,050,302                Dated September 27, 1977

Inventor(s) Warren E. Haupin

It is certified that error appears in the above-identified patent and that said Letters Patent are hereby corrected as shown below:

Col. 7, line 53            Before "plate" insert --upper--.

Col. 10, line 4            Change "seriesrelation" to --series
(claim 3)                  relation--.

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*